US012782324B2

(12) United States Patent
Shimojima et al.

(10) Patent No.: US 12,782,324 B2
(45) Date of Patent: Nov. 3, 2026

(54) COLUMN OVEN AND CHROMATOGRAPHY

(71) Applicant: SHIMADZU CORPORATION, Kyoto (JP)

(72) Inventors: Kei Shimojima, Kyoto (JP); Koji Numata, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 958 days.

(21) Appl. No.: 17/472,727

(22) Filed: Sep. 13, 2021

(65) Prior Publication Data

US 2023/0079354 A1 Mar. 16, 2023

(51) Int. Cl.
*G01N 30/30* (2006.01)
*B01D 15/08* (2006.01)

(52) U.S. Cl.
CPC ............. *G01N 30/30* (2013.01); *B01D 15/08* (2013.01); *G01N 2030/3084* (2013.01)

(58) Field of Classification Search
CPC ... G01N 2030/3061; G01N 2030/3084; G01N 30/6047; B01D 15/10; B01D 15/161; B01D 15/22
See application file for complete search history.

(56) References Cited

U.S. PATENT DOCUMENTS 5,074,662 A * 12/1991 Sullivan ................. G01N 21/03 356/244
2002/0107652 A1 8/2002 Andrews et al.
2013/0052083 A1* 2/2013 Kirby ...................... F24H 1/142 392/465

FOREIGN PATENT DOCUMENTS

DE 19605814 A1 * 8/1997 ............ B01L 3/5025
JP 2000111536 A * 4/2000
JP 2008-224559 A 9/2008
JP 2009-31305 A 2/2009

OTHER PUBLICATIONS

Office Action for corresponding JP Application No. 2019-045348 issued May 24, 2022, with English language translation.

(Continued)

*Primary Examiner* — Ryan B Huang
(74) *Attorney, Agent, or Firm* — Renner, Otto, Boisselle & Sklar, LLP

(57) ABSTRACT

For providing a column oven and chromatography capable of reliably preventing misconnection of a storage unit to a connecting part, the column oven includes: a hollow casing; a column unit including an analysis column, which is arranged in the casing and allows a mobile phase (Q) to flow through, and a storage unit, which is attached to the analysis column and stores data of the analysis column; multiple holding parts, which are arranged in the casing and hold the analysis column; a tabular fixing plate, which is arranged in the casing and fixes the respective holding parts to the casing; multiple connecting parts, which are arranged in the casing and connect the storage unit electrically and detachably; and a heating part, which heats the analysis column held by the holding parts in the casing. When viewing the analysis column from a side facing the fixing plate with the analysis column held by the holding parts, the connecting parts connected to the storage unit of the column unit including the analysis column are arranged adjacent to the analysis column.

18 Claims, 10 Drawing Sheets

(56) References Cited

OTHER PUBLICATIONS

Agilent 1200 Series Thermostatted col. Compartment G1316A/G1316B/G1316C; User Manual; AgilentTechnologies, 2008. English and Japanese versions submitted herewith in one document.

* cited by examiner

COLUMN OVEN AND CHROMATOGRAPHY

TECHNICAL FIELD

The present invention relates to a column oven and chromatography.

BACKGROUND ART

Chromatography systems for separating into multiple components a mobile phase which is an object of analysis, namely analytes using a column are known (See Patent Document 1, for example). The chromatography system described in Patent Document 1 includes a storage means that has an application program for specifying a column to be used for analysis.

PRIOR ART DOCUMENTS

Patent Documents

Patent Document 1: JP 2009-031305A

DISCLOSURE OF THE INVENTION

Problems to be Solved by the Invention

For example, in a case where multiple columns are configured loadable into the chromatography system, the storage means may have multiple connectors (connecting parts) for obtaining data that specifies a column, wherein the number of the connectors arranged is the same as that of loadable columns. In this case, when carrying out analysis, there is a fear of using an incorrect connector that is not the connector corresponding to the column to be used for the analysis.

The aim of the present invention is to provide a column oven and chromatography capable of reliably preventing misconnection of the storage unit to the connecting parts.

Means of Solving the Problems

A first aspect of the present invention relates to a column oven, including: a hollow casing; a column unit comprising an analysis column, which is arranged in the casing and allows a mobile phase to flow through, and a storage unit, which is attached to the analysis column and stores data of the analysis column; multiple holding parts, which are arranged in the casing and hold the analysis column; a tabular fixing plate, which is arranged in the casing and fixes the respective holding parts to the casing; multiple connecting parts, which are arranged in the casing and connect the storage unit electrically and detachably; and a heating part, which heats the analysis column held by the holding parts in the casing. When viewing the analysis column from a side facing the fixing plate with the analysis column held by the holding parts, the connecting parts connected to the storage unit of the column unit including the analysis column are arranged adjacent to the analysis column.

A second aspect of the present invention relates to chromatography including the column oven of the first aspect of the present invention.

Results of the Invention

When carrying out connecting work for a second storage unit, the present invention allows connection of the second storage unit to a connecting part without fail due to an analysis column and the connecting part having an adjacent positional relationship.

DESCRIPTION OF EMBODIMENTS

A column oven and chromatography of the present invention is described in detail below based on preferred embodiments illustrated in the attached drawings.

First Embodiment

Figure 1:
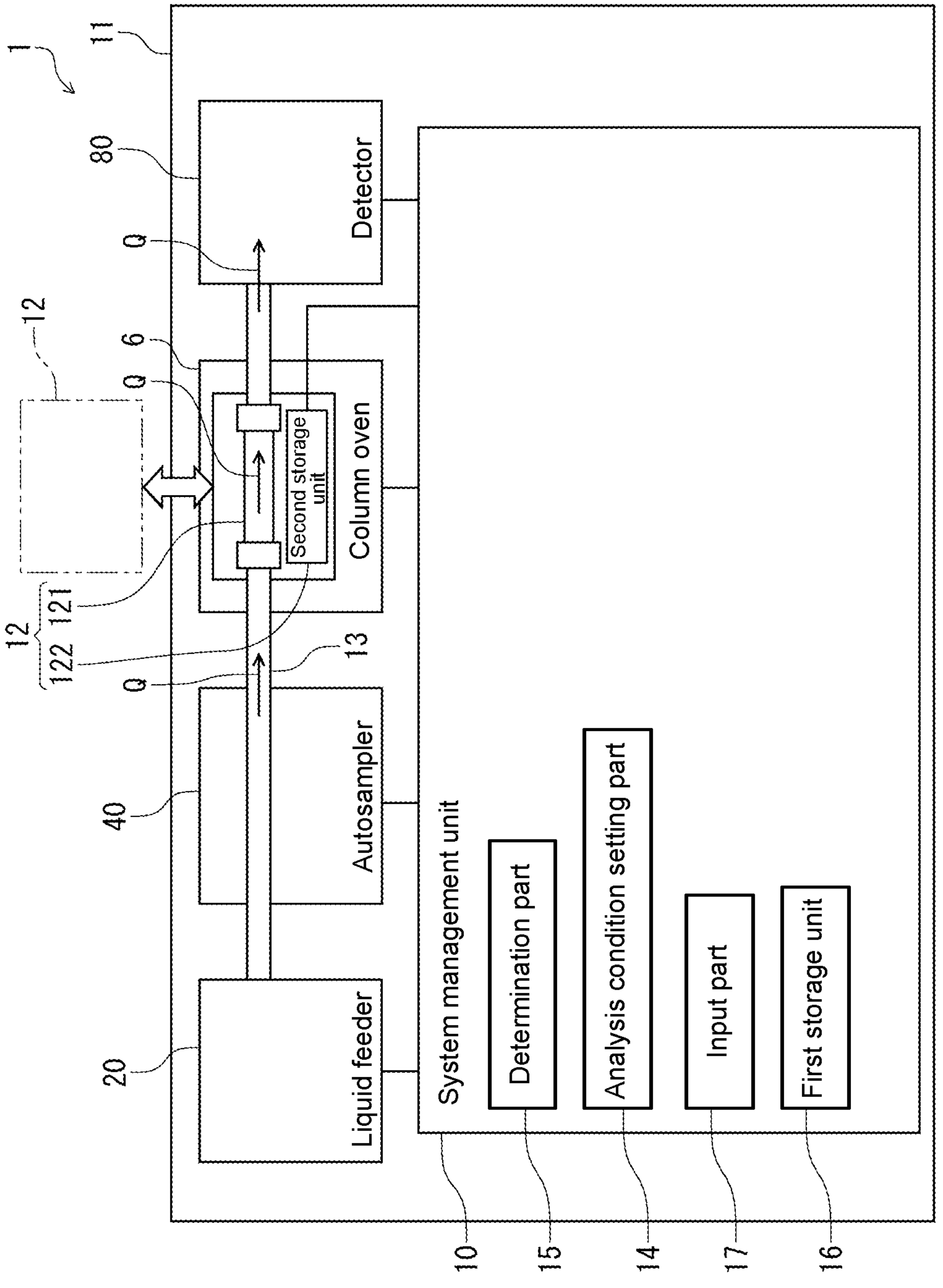
FIG. 1 is a schematic drawing (block diagram) illustrating a First Embodiment of a chromatography system according to the present invention.
Figure 2:
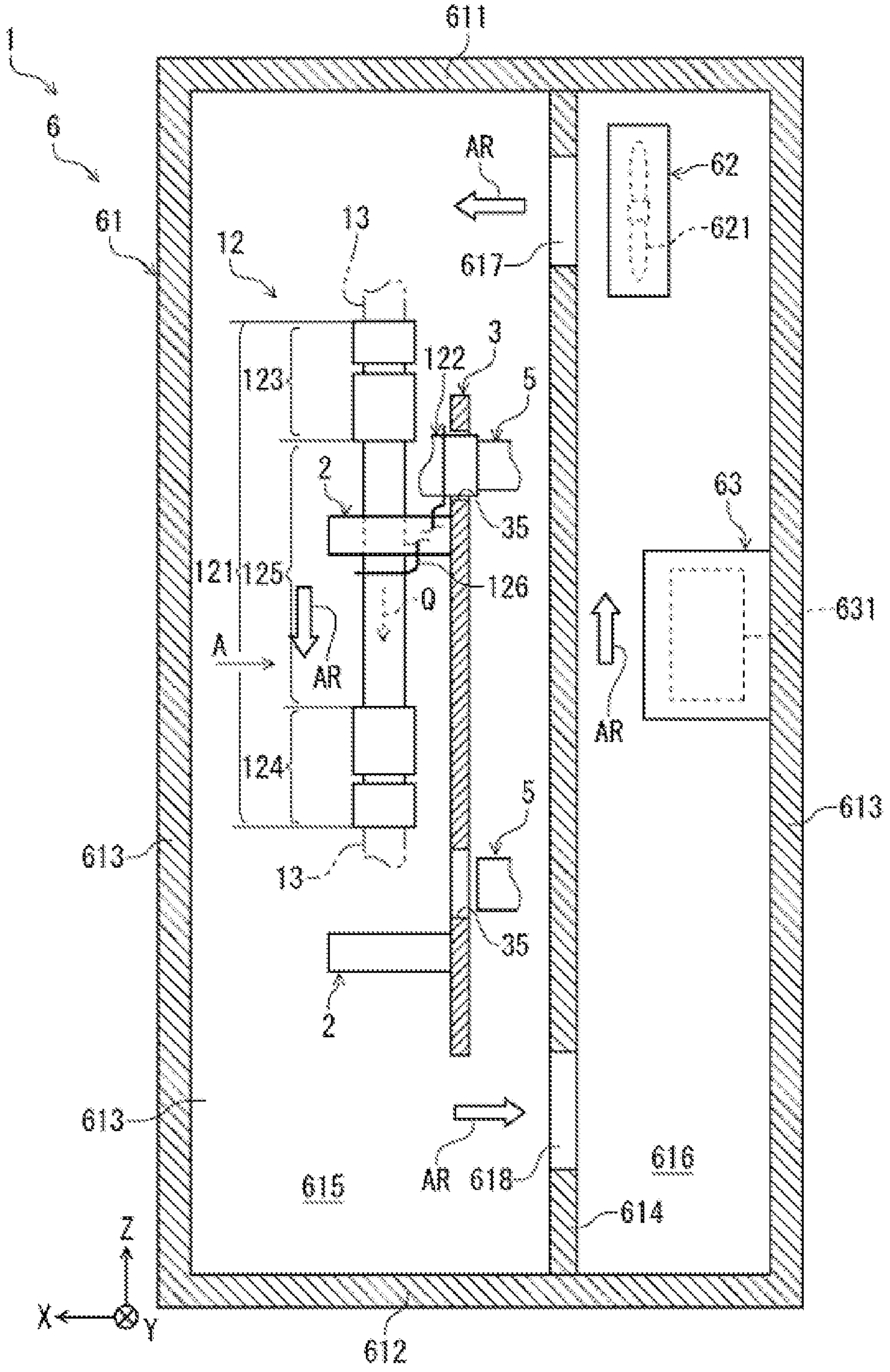
FIG. 2 is a vertically cut cross-sectional view illustrating an internal structure of a column oven provided in the chromatography system of FIG. 1.
Figure 3:
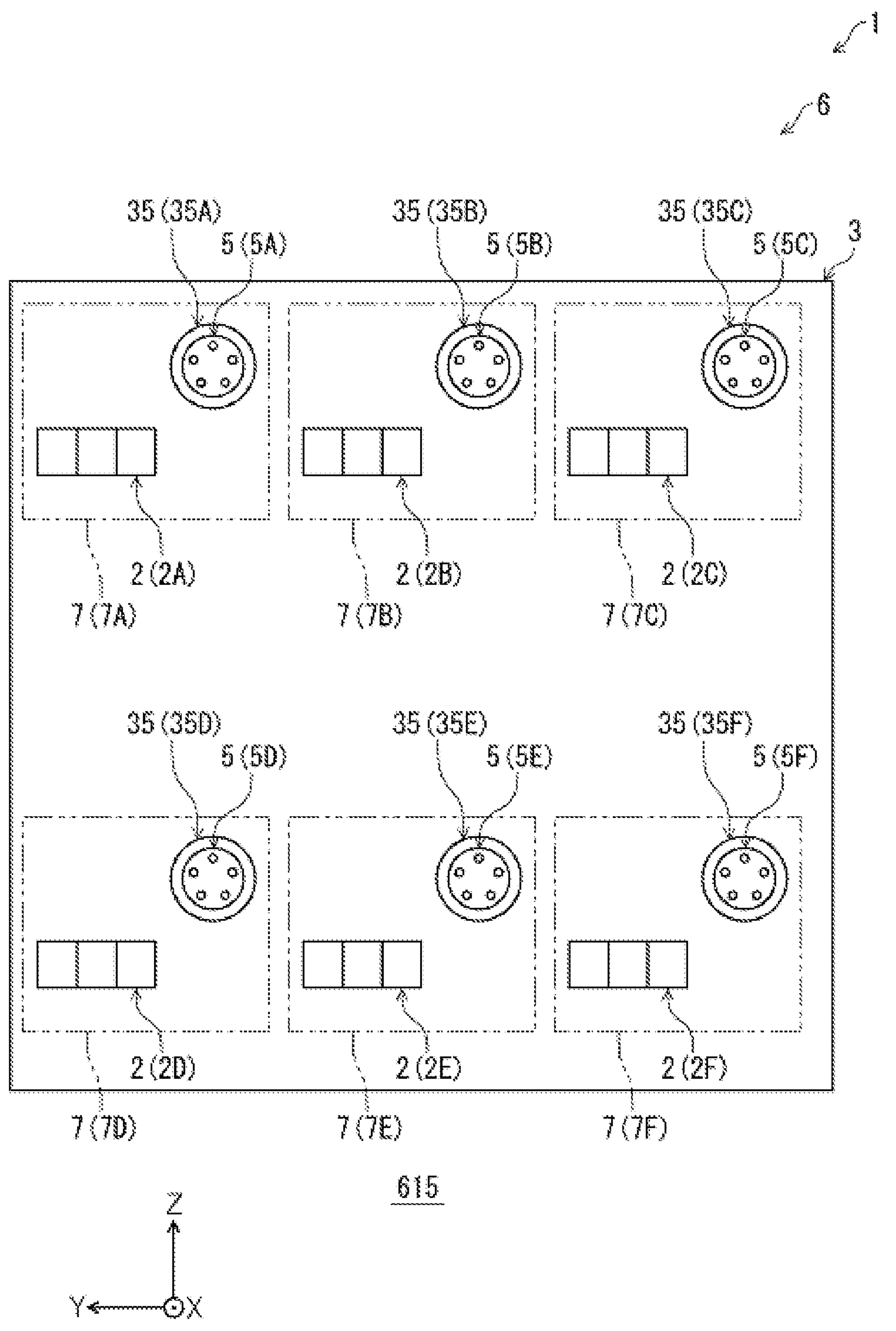
FIG. 3 is a diagram illustrating in order the steps of loading a column unit into the column oven when viewed from arrow A in FIG. 2.
Figure 4:
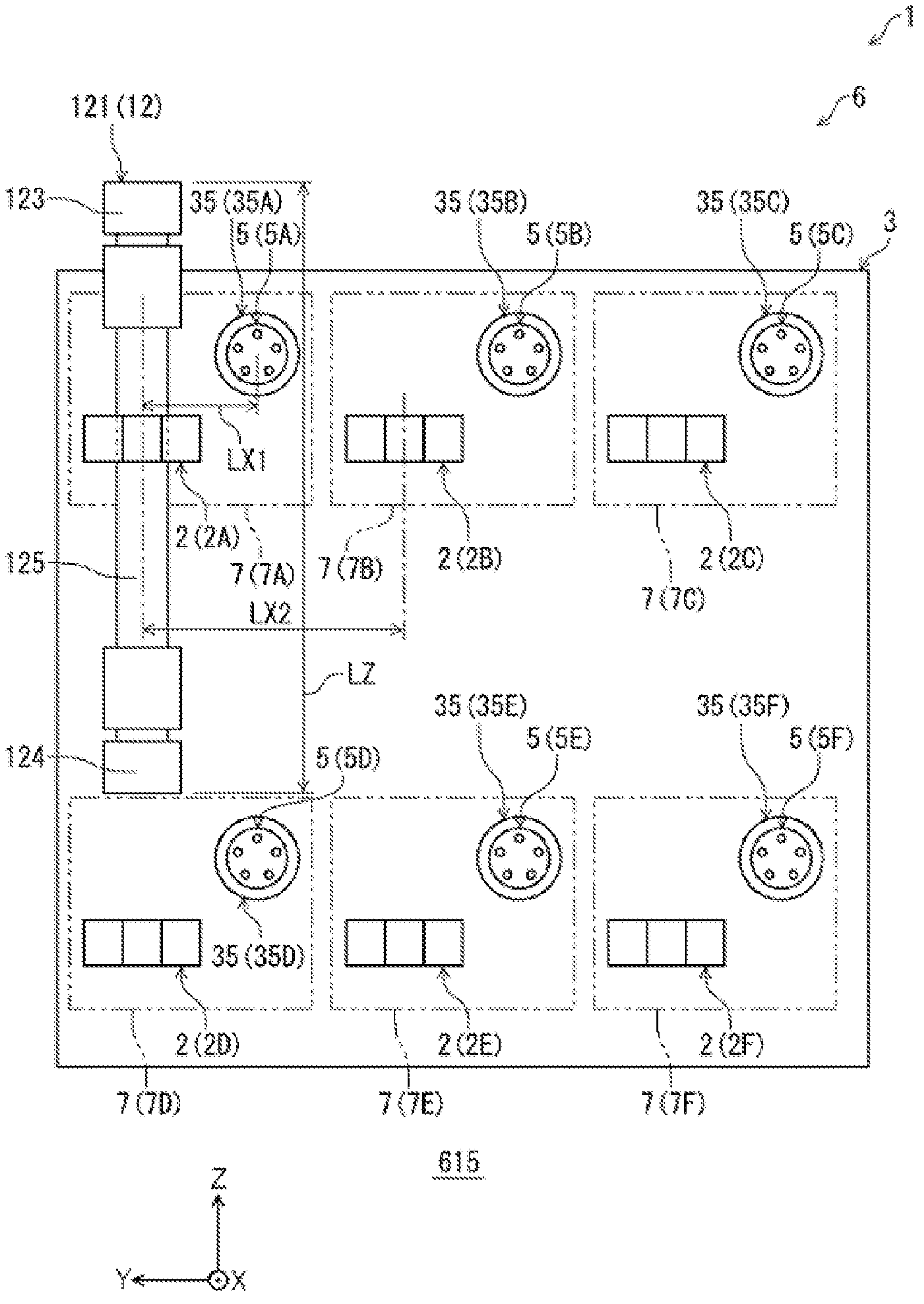
FIG. 4 is a diagram illustrating in order the steps of loading the column unit into the column oven when viewed from arrow A in FIG. 2.
Figure 5:
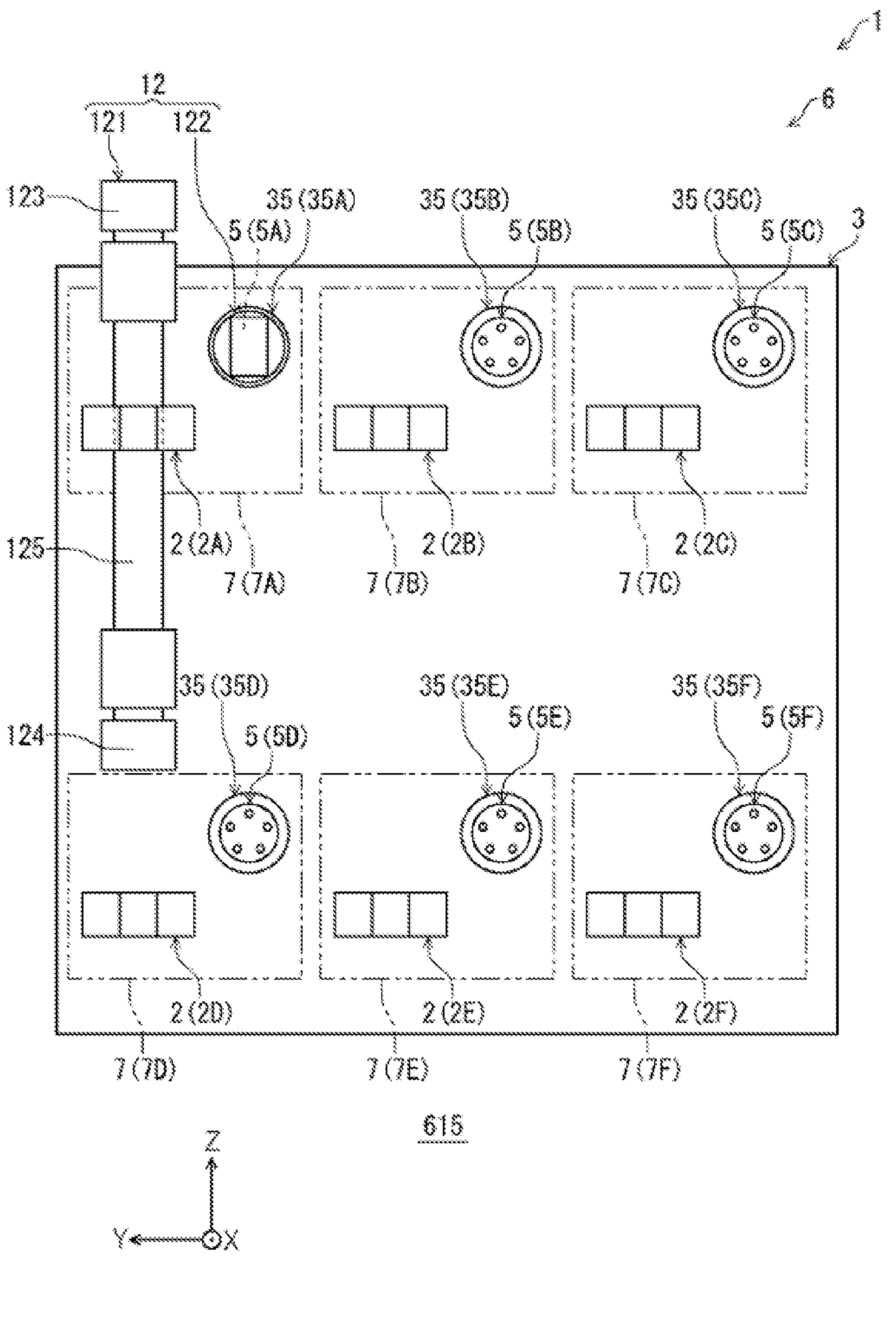
FIG. 5 is a diagram illustrating in order the steps of loading the column unit into the column oven when viewed from arrow A in FIG. 2.

FIG. 1 is a schematic drawing (block diagram) illustrating a First Embodiment of a chromatography system according to the present invention. FIG. 2 is a vertically cut cross-sectional view illustrating an internal structure of a column oven provided in the chromatography system of FIG. 1. FIG. 3 is a diagram illustrating in order the steps of loading a column unit into the column oven when viewed from arrow A in FIG. 2. FIG. 4 is a diagram illustrating in order the steps of loading the column unit into the column oven when viewed from arrow A in FIG. 2. FIG. 5 is a diagram illustrating in order the steps of loading the column unit into the column oven when viewed from arrow A in FIG. 2.

Note that for convenience of explanation, one of the horizontal directions is called 'X-axis direction', the orthogonal direction to the X-axis direction of the horizontal directions is called 'Y-axis direction', and the vertical direction, namely the orthogonal direction to each of the X-axis direction and the Y-axis direction is called 'Z-axis direction' herein. Moreover, the arrow side of the respective axis directions is called 'positive side', and the opposite side to the arrows is called 'negative side'. Furthermore, the upper side in FIGS. 2 to 10 is called 'top (or top part)' and the lower side is called 'bottom (or bottom part)'.

A case where a chromatography system 1 is applied as a liquid chromatography system for analyzing samples of a liquid that is a type of mobile phase Q under multiple analysis conditions is described below as an example; in addition, the chromatography system 1 may be applied in the same way to a supercritical fluid chromatography system or a gas chromatography system.

As shown in FIG. 1, the chromatography system 1 includes a liquid feeder 20, an autosampler 40, a column oven 6, a detector 80 and a system management unit 10 configuring an apparatus main body 11 of the chromatography system 1, and an analysis column 121 that is replaced in the apparatus main body 11 detachably.

The liquid feeder 20, the autosampler 40, the column oven 6 and the detector 80 are arranged in this order in the flowing direction of the mobile phase Q, that is, from upstream to downstream. Moreover, the liquid feeder 20, the autosampler 40, the column oven 6 and the detector 80 are connected via pipes configuring a flow channel 13. The mobile phase Q may flow through the flow channel 13.

Note that aside from an analysis sample, a buffer solution used in analysis, a cleaning solvent, such as an organic solvent to clean a stationary phase, etc. are available as the mobile phase Q, for example.

Furthermore, the system management unit 10 is electrically connected to the liquid feeder 20, the autosampler 40, the column oven 6 and the detector 80. This system management unit 10 is composed of, for example, a CPU for executing logical operations, a ROM storing a necessary operation program for control of the liquid feeder 20 etc., a RAM temporarily storing data etc. at the time of control, etc., and can control the entire chromatography system 1.

The liquid feeder 20 has a liquid feeding pump, for example, and can transfer the mobile phase Q through the flow channel 13 downstream using this liquid feeding pump. Moreover, changing the rotation speed of the liquid feeding pump can adjust the transfer speed of the mobile phase Q.

The autosampler 40 is for injecting the mobile phase Q into the flow channel 13.

The analysis column 121 may be loaded into the column oven 6. As a result, the analysis column 121 is arranged midway in the flow channel 13, and a sample is injected into the mobile phase Q from the autosampler 40 so as to flow (pass) through inside. At that time, the sample may be separated into multiple components.

The column oven 6 can heat the analysis column 121 together with each sample. This allows adjustment of the temperature of the sample to a predetermined temperature. Structure of the column oven 6 is described later.

The detector 80 is for detecting components separated by the analysis column 121.

Moreover, as illustrated in FIG. 1, the chromatography system 1 includes the system management unit 10. This system management unit 10 includes an analysis condition setting part 14, a determination part 15, an input part 17, and a first storage unit (memory unit) 16.

Of the chromatography system 1, the analysis column 121 along with a second storage unit 122 attached to the analysis column 121 configure a column unit 12. When the analysis column 121 is replaced, the replacement is carried out together with the second storage unit 122.

The analysis condition setting part 14 is capable of setting multiple analysis conditions. The analysis conditions include type of sample, type of stationary phase filled in the analysis column 121, etc., for example. As a result, the chromatography system 1 can analyze samples under multiple analysis conditions.

For example, in the case of using two types of analysis samples, the analysis condition setting part 14 sets a first analysis condition when analyzing one sample while the analysis condition setting part 14 sets a second analysis condition different from the first analysis condition when analyzing the other sample. With the first analysis condition, an analysis column 121 matching the analysis of the one sample is used, and with the second analysis condition, an analysis column 121 matching the analysis of the other sample is used.

The determination part 15 determines whether the analysis condition set by the analysis condition setting part 14 is selectable.

The first storage unit 16 is pre-stored with mobile phase data of the type of the mobile phase Q, for example. The first storage unit 16 can store the mobile phase data by name and number etc. of the mobile phase Q.

The second storage unit 122 is pre-stored with a second data or individual information of the analysis column 121 as data of the analysis column. In this embodiment, an analysis column 121 is specified according to type of stationary phase that is filled inside. The analysis column 121 itself can be specified by the second data. Note that each column unit 12 in this embodiment includes the analysis column and the second storage unit 122 joined via a flexible wire 126.

The structure of the column oven 6 is described next.

As illustrated in FIG. 2, the column oven 6 includes a casing 61, a rotational flow generation part 62 for generating a rotational flow in the casing 61, a heating part 63 for heating the analysis column 121 in the casing 61, multiple holding parts 2 for holding the analysis column 121 in the casing 61, a tabular fixing plate 3 for fixing the holding parts 2 in the casing 61, and multiple connecting parts 5 for connecting the second storage unit 122 in the casing 61 electrically and detachably. Note that the arranged number of the holding parts 2 and of the connecting parts 5 is the same in this embodiment.

The casing 61 is constituted by a hollow box having a top wall 611 arranged on the top side, a bottom wall 612 arranged on the bottom side, and multiple side walls 613 arranged between the top wall 611 and the bottom wall 612. Preferably, at least these walls of the casing 61 have thermal insulation.

Moreover, the casing 61 has a partition 614 dividing the inside into a first space 615 and a second space 616. In the structure illustrated in FIG. 2, the first space 615 is divided by the partition 614 into the X-axis direction positive side, and the second space 616 is divided into the X-axis direction negative side. The analysis column 121, the second storage unit 122, the holding parts 2 and the fixing plate 3 are arranged in the first space 615. On the other hand, the rotational flow generation part 62 and the heating part 63 are arranged in the second space 616.

The heating part 63 has a heater 631 for generating heat through electric conduction, and heats air AR in the casing 61 (second space 616) by the heater 631 generating heat. The analysis column 121 held by the holding parts 2 together with each sample may be heated by the heated air AR in the casing 61 (first space 615). This allows adjustment of the temperature of the sample to a predetermined temperature.

The rotational flow generation part 62 is arranged higher than the heating part 63. The rotational flow generation part 62 discharges as a rotational flow the air AR heated by the heating part 63 into the first space 615. The air AR discharged into the first space 615 is then used for the heating of the analysis column 121.

The rotational flow generation part 62 has a fan 621 supported rotatably, and generates a rotational flow due to the rotation of this fan. This allows reliable discharge of the air AR into the first space 615 so as to reach the analysis column 121 in proper quantity, thereby heating of the analysis column 121 to a desired temperature.

Note that in the partition 614 are provided a discharge opening 617 for discharging the air AR within the second space 616 to the first space 615, and a suction opening 618 positioned lower than the discharge opening 617 and through which the air AR within the first space 615 is suctioned into the second space 616. This allows circulation of the air AR between the first space 615 and the second space 616. In this manner, it is structured such that the analysis column 121 is heated by the circulating air AR in this embodiment; however, it is not limited thereto. For example, it may be structured such that the analysis column 121 is heated by radiant heat (radiation heat) using a heating block.

The analysis column 121 makes a long form, and is arranged along the Z axis in the first space 615 of the casing 61. Note that while the analysis column 121 is arranged along the Z axis in this embodiment, it is not limited thereto, and may be arranged along the X axis or the Y axis, for example.

The analysis column 121 has a base end part 123 positioned upstream in the flow direction of the mobile phase Q, a tip part 124 positioned downstream in the flow direction of the mobile phase Q, and a middle part 125 between the tip part 124 and the base end part 123. In this embodiment, the analysis column 121 is used with the base end part 123 arranged on the top side and the tip part arranged on the bottom side.

Moreover, of the base end part 123, the tip end 124 and the middle part 125 of the analysis column 121, only the middle part 125 is held by the holding part 2. In this embodiment, the middle part 125 makes a round cross-sectional shape, having a constant outer diameter along the Z axis.

As illustrated in FIG. 2, the analysis column 121 is held by a single holding part 2 within the first space 615. The holding part 2 clamps the middle part 125 of the analysis column 121, and can thereby hold the analysis column 121 in an orientation along the Z axis. Note that while the number of the holding part 2 used to hold the analysis column 121 is one in this embodiment, it is not limited thereto, and may be two or more, for example.

Moreover, each of the holding parts 2 is fixed to the casing 61 via the fixing plate 3. The fixing plate 3 makes a tabular form, and is arranged as a whole in parallel with the Y axis and the Z axis, that is, parallel to the YZ plane.

As illustrated in FIGS. 3 to 5, the fixing plate 3 has six holding parts 2 arranged in a matrix form. The six holding parts 2 are arranged where two are at equal intervals along the X axis and three are at equal intervals along the Y axis in this embodiment, arrangement aspects of the holding parts 2 are not limited thereto. The holding parts 2 are referred to as 'holding part 2A', 'holding part 2B', 'holding part 2C', 'holding part 2D', 'holding part 2E' and 'holding part 2F' in this order from the one illustrated on the top left side of FIGS. 3 to 5.

Note that while the number of the holding parts 2 arranged on the fixing plate 3 is six in this embodiment, it is not limited thereto, and may be two to five, or seven or more, for example. In this case as well, the number of the holding parts 2 along the X axis and number of the holding parts 2 along the Y axis are arbitrary.

The fixing plate 3 has multiple through-holes 35 formed by piercing through the thickness of the fixing plate. The through-holes 35 make circular forms when viewed from a direction facing the fixing plate 3. This allows visibility of the connecting parts 5 one at a time from the X-axis direction positive side via the respective through-holes 35.

The second storage unit 122 may be connected to each of the connecting parts 5 in detachable manner. Moreover, each of the connecting parts 5 is electrically connected to the system management unit 10. As a result, the system management unit 10 can read data stored in the second storage unit 122, with the second storage unit 122 connected to the connecting parts 5.

Furthermore, the number of the through-holes 35 is the same as number of arranged holding parts 2, which is six in this embodiment. The six through-holes 35 are arranged where two are at equal intervals along the X axis and three are at equal intervals along the Y axis. The through-holes 35 are referred to as 'through-hole 35A', 'through-hole 35B', 'through-hole 35C', 'through-hole 35D', 'through-hole 35E' and 'through-hole 35F' in this order from the one illustrated on the top left side of FIGS. 3 to 5. Further, the connecting part 5 visible via the through-hole 35A is called 'connecting part 6A', the connecting part 5 visible via the through-hole 35B is referred to as 'connecting part 5B', the connecting part 5 visible via the through-hole 35C is referred to as 'connecting part 5C', the connecting part 5 visible via the through-hole 35D is referred to as 'connecting part 5D', the connecting part 5 visible via the through-hole 35E is referred to as 'connecting part 5E', and the connecting part 5 visible via the through-hole 35F is referred to as 'connecting part 5F'.

As illustrated in FIGS. 3 to 5, the through-hole 35A is positioned in the vicinity of the top left side of the holding part 2A, the through-hole 35B is positioned in the vicinity of the top left side of the holding part 2B, the through-hole 35C is positioned in the vicinity of the top left side of the holding part 2C, the through-hole 35D is positioned in the vicinity of the top left side of the holding part 2D, the through-hole 35E is positioned in the vicinity of the top left side of the holding part 2E, and the through-hole 35F is positioned in the vicinity of the top left side of the holding part 2F in this embodiment.

In addition, column loading parts 7 are prepared in respective unit regions, each enclosed by a chain double-dashed line, and the column unit 12 is loaded one by one onto each of the column loading parts 7. The column loading parts 7 are referred to hereafter as 'column loading part 7A', 'column loading part 7B', 'column loading part 7C', 'column loading part 7D', 'column loading part 7E' and 'column loading part 7F' in this order from the one illustrated on the top left side of FIGS. 3 to 5. Accordingly, in this embodiment, a maximum of six column units 12 may be loaded into the column oven 6. Note that each of the column loading parts 7 includes a holding part 2 and a connecting part 5.

In the case of using the column loading part 7A, for example, it is necessary to make the holding part 2A hold the analysis column 121, and to connect to the connecting part 5*a* the second storage unit 122 joined to the analysis column 121 via a wire 126. Due to this connection, the system management unit 10 can read data of the analysis column 121 that is stored in the second storage unit 122, thereby conducting accurate analysis. In contrast, when the second storage unit 122 is connected to a different one of the connecting part 6B to the connecting part 5F than the connecting part 5A, there is a fear of inaccurate analysis.

Accordingly, the column oven 6 (chromatography system 1) is structured so as to prevent such misconnection. This structure and function are described next. Here, a case of loading a column unit 12 onto the column loading part 7A is described as an example.

First, as illustrated in FIG. 3, the column loading part 7A to the column loading part 7F are not loaded with a column unit 12. Note that the column loading part 7A to the column loading part 7F may be given consecutive numbers, for example.

Next, position of the column loading part 7A is confirmed, and as illustrated in FIG. 4, the holding part 2 is made to hold the analysis column 121. In this state where the analysis column 121 is held by the holding part 2, the analysis column 121 and the connecting part 5A have the following positional relationship. Note that the connecting part 5A is the connecting part 5 that should be connected to the second storage unit 122 of the column unit 12 having the analysis column 121, that is, the second storage unit 122 joined to the analysis column 121 via the wire 126.

When the analysis column 121 is viewed from the side facing the fixing plate 3 (X-axis direction positive side), the connecting part 5A is arranged adjacent to the analysis column 121, as illustrated in FIG. 4. Note that inter-center distance LX1 along the X-axis between a center line of the analysis column 121 (holding part 2) and center line of the connecting part 5A is not particularly limited, but is preferably 10 mm or greater and 50 mm or less, more preferably 20 mm or greater and 40 mm or less, for example. Moreover, the inter-center distance LX1 is preferably shorter than inter-center distance LX2 along the X axis between the center line of a holding part 2 and that of the adjacent holding part 2 in the Y-axis direction.

Next, when carrying out connecting work for the second storage unit 122, due to the fact that the analysis column 121 and the connecting part 5A have the positional relationship of being arranged adjacent to each other, connection of the second storage unit 122 to the connecting part 5A without error is possible, as illustrated in FIG. 5.

Even if multiple connecting parts 5 are arranged in the column oven 6 in this manner, the second storage unit 122 may be reliably connected to a corresponding connecting part 5, thereby preventing misconnection of the second storage unit 122 reliably.

Moreover, as illustrated in FIG. 4, when the analysis column 121 is viewed from the side facing the fixing plate 3 (X-axis direction positive side), the connecting part 5A is arranged within the entire length LZ of the analysis column 121. Considering the positional relationship, this allows reliable prevention of misconnection of the second storage unit 122.

Note that while the case where the column unit 12 is loaded onto the column loading part 7A has been described, cases where the column unit 12 is loaded onto any one of the column loading part 7B to the column loading part 7F can also reliably prevent misconnection of the second storage unit 122 in the same manner.

In the column loading part 7A to the column loading part 7C, the holding parts 2 and the connecting parts 5 are arranged alternately along the Y axis (unidirection), as illustrated in FIG. 3. Even in the column loading part 7D to the column loading part 7F, the holding parts 2 and the connecting parts 5 are arranged alternately along the Y axis (unidirection) in the same manner.

Due to this alternating arrangement, the adjacent holding part 2 and connecting part 5 within each of the column loading parts 7 may be emphasized and made visible. As a result, when the column unit 12 is loaded onto the column loading part 7A, for example, the second storage unit 122 of said column unit 12 can be reliably connected to the connecting part 5A.

Second Embodiment

Figure 6:
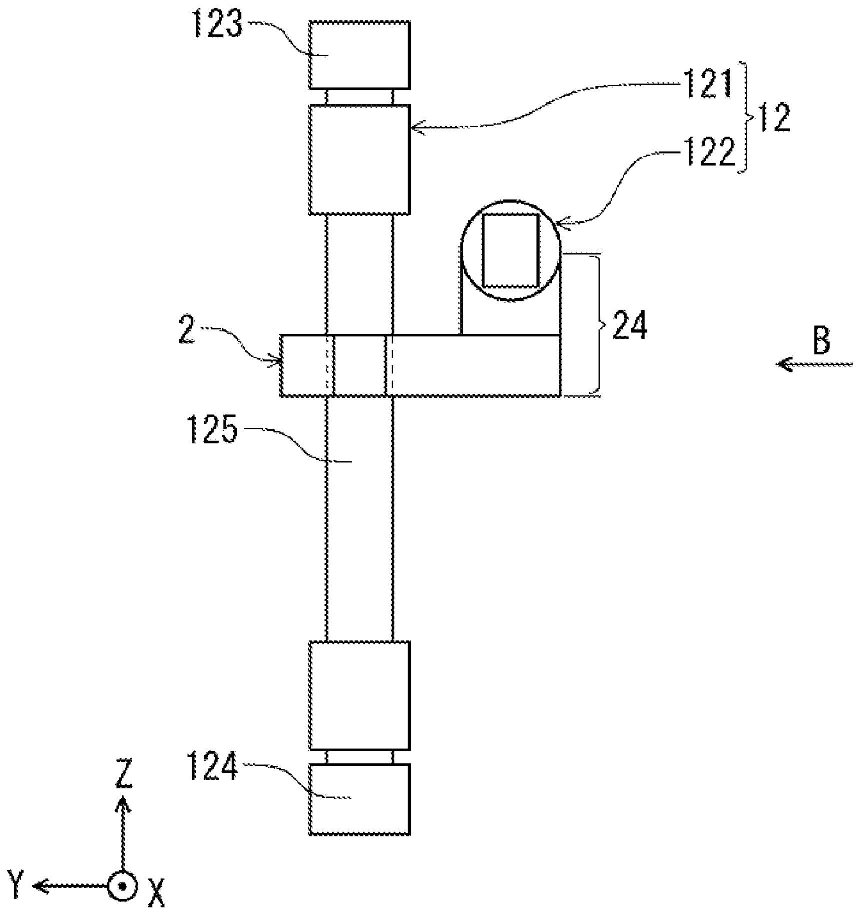
FIG. 6 is a diagram illustrating a column unit in a chromatography system (Second Embodiment) according to the present invention.
Figure 7:
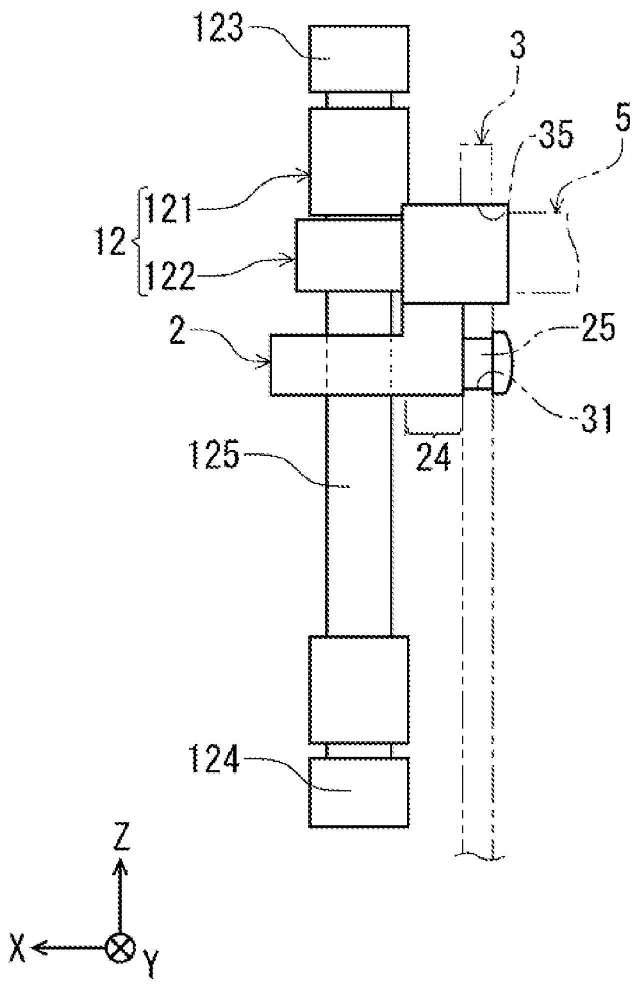
FIG. 7 is a diagram when viewed from arrow B in FIG. 6.

FIG. 6 is a diagram illustrating a column unit in a chromatography system (Second Embodiment) according to the present invention. FIG. 7 is a diagram when viewed from arrow B in FIG. 6.

A Second Embodiment of the column oven and the chromatography according to the present invention is described below while referencing these diagrams. However, differences with the embodiment described above are mainly described, and description of the same items is omitted.

According to this embodiment illustrated in FIGS. 6 and 7, the holding part 2 has a joining part 24, which joins the analysis column 121 and the second storage unit 122 with the positional relationship kept intact, and an engagement part 25, which fixes the holding part 2 to the fixing plate 3 detachably, for a single column unit 12.

The joining part 24 is arranged on the X-axis direction negative side of the holding part 2, and supports and fixes the second storage 122.

Moreover, a through-hole 31 for connecting the engagement part 25 is formed by piercing through the fixing plate 3 for each column loading part 7. The engagement part 25 is configured by a projecting part projecting like a column toward the X-axis direction negative side.

Then, the engagement part 25 may be inserted through the through-hole 31 to fix the holding part 2 to the fixing plate 3. At this time, as long as the analysis column 121 and the second storage unit 122 have been joined via the holding part 2, connecting work of connecting the second storage unit 122 to a predetermined connecting part 5 may be carried out due to the fixing work of fixing the holding part 2 to the fixing plate 3. In this manner, the fixing work and the connecting work may be carried out collectively (in one action), improving workability before starting analysis. Moreover, forgetting to carry out the connecting work may also be prevented.

Furthermore, detaching the holding part 2 from the fixing plate 3 is possible by extracting the engagement part 25 from the through-hole 31. This allows carrying out disconnecting work of disconnecting the second storage unit 122 and the connecting part 5 due to the detaching work of detaching the holding part 2 from the fixing plate 3. In this manner, the detaching work and the disconnecting work may be carried out collectively (in one action), improving workability after analysis is completed.

The holding part 2 has a function as the joining part 24; however, not limited thereto, the joining part 24 may be omitted. In this case, a joining member having a function as the joining part 24 is prepared in addition to the holding part 2. Then, if the analysis column 121 is held by the holding part 2 with the analysis column 121 and the second storage unit 122 joined via the joining member, connecting work of connecting the second storage unit 122 to the connecting part 5 may be carried out due to this holding work.

Third Embodiment

Figure 8:
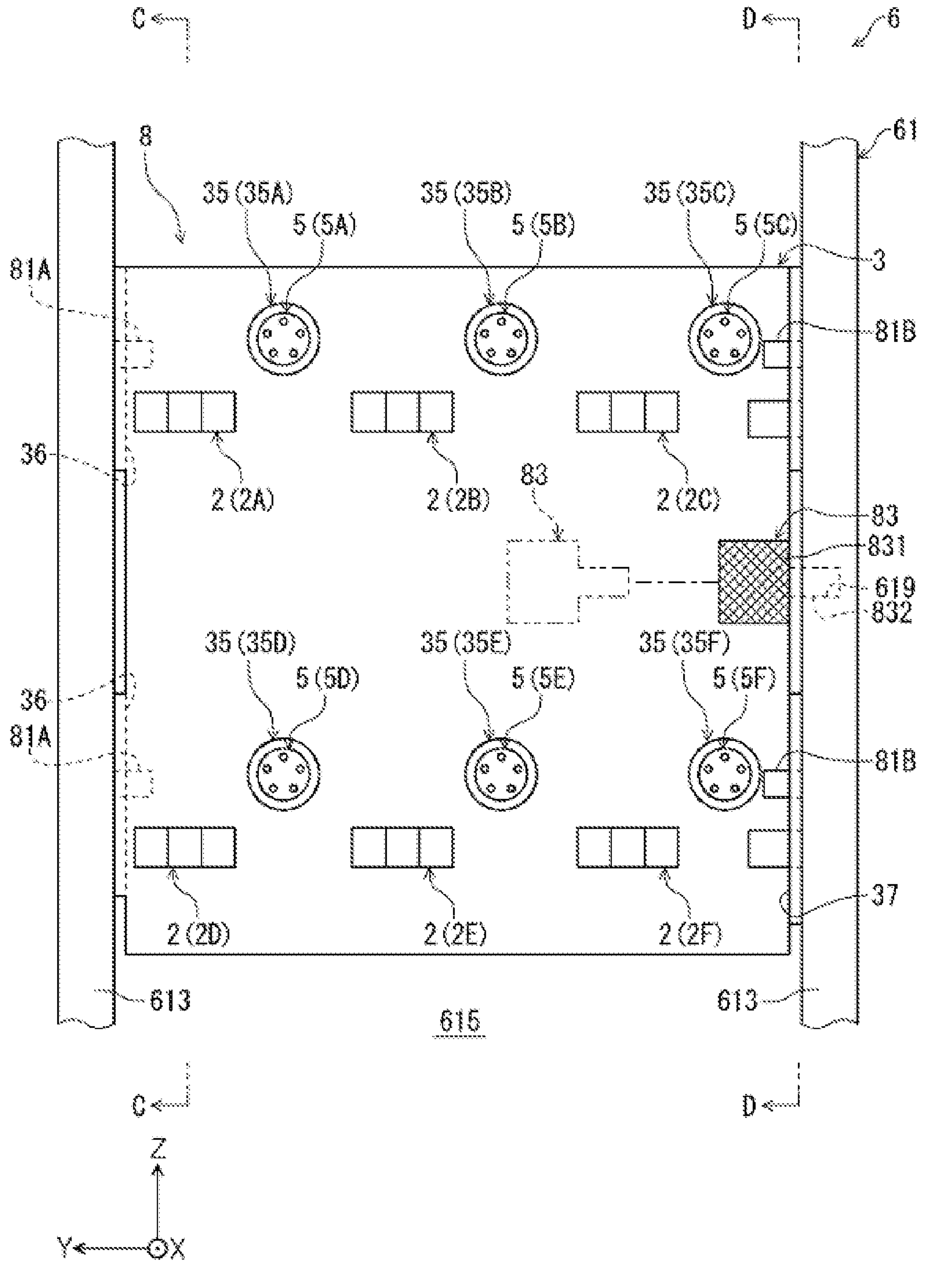
FIG. 8 is a diagram illustrating a relationship between a casing and a fixing plate in a chromatography system (Third Embodiment) according to the present invention.
Figure 9:
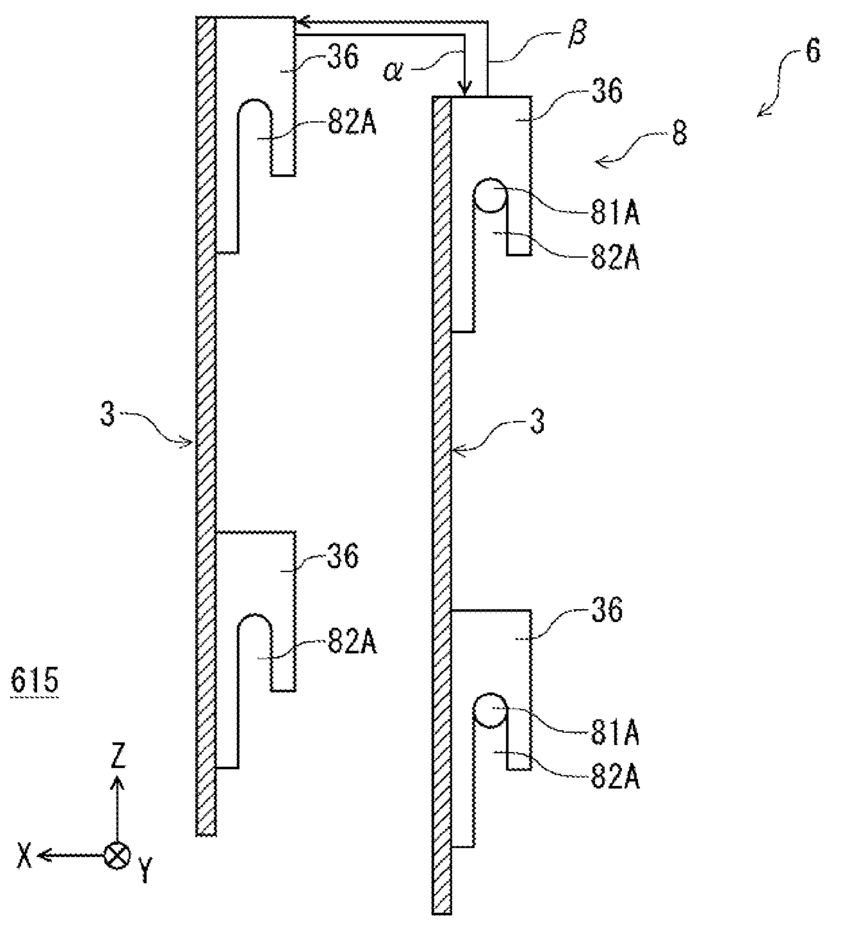
FIG. 9 illustrates the steps of attaching and detaching the fixing plate to and from the casing in a cross-sectional diagram cut along a line C-C in FIG. 8.
Figure 10:
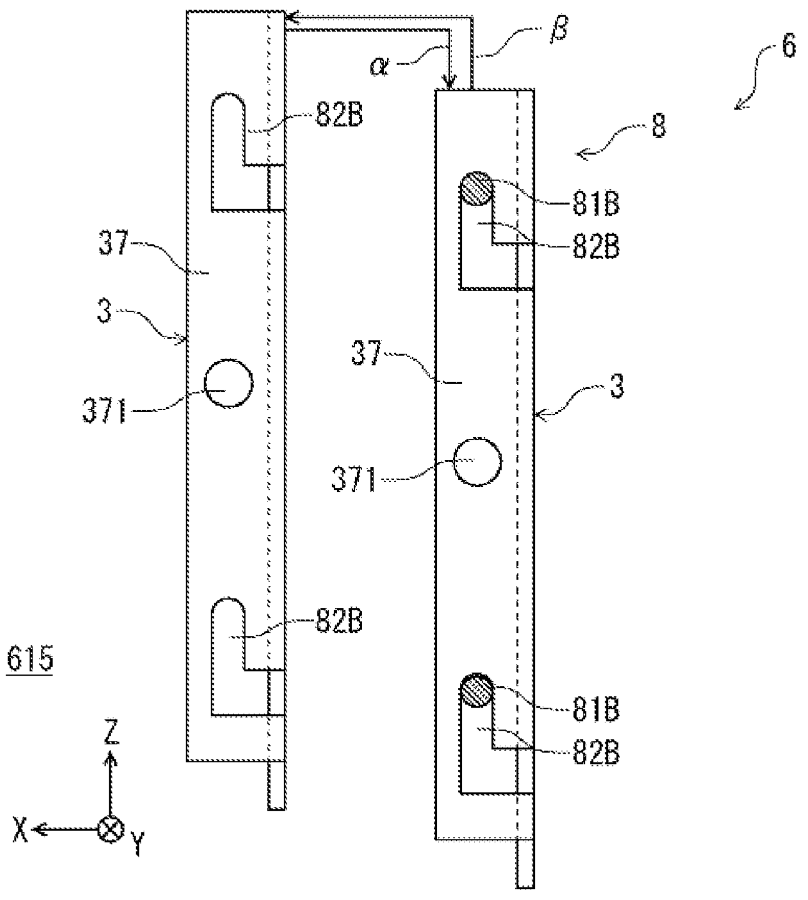
FIG. 10 illustrates the steps of attaching and detaching the fixing plate to and from the casing in a cross-sectional diagram cut along a line D-D in FIG. 8.

FIG. 8 is a diagram illustrating a relationship between a casing and a fixing plate in a chromatography system (Third Embodiment) according to the present invention. FIG. 9 illustrates the steps of attaching and detaching the fixing plate to and from the casing in a cross-sectional diagram cut along a line C-C in FIG. 8. FIG. 10 illustrates the steps of attaching and detaching the fixing plate to and from the casing in a cross-sectional diagram cut along a line D-D in FIG. 8.

A Third Embodiment of the column oven and the chromatography according to the present invention is described below while referencing these diagrams. However, differences with the embodiments described above are mainly described, and description of the same items is omitted.

As illustrated in FIGS. 8 to 10, the column oven 6 according to this embodiment includes a mounting part 8 for mounting the fixing plate 3 on the casing 61 detachably. The mounting part 8 has a projecting part 81A provided on a sidewall 613 positioned on the Y-axis direction positive side of the casing 61, a projecting part 81B provided on the sidewall 613 positioned on the Y-axis direction negative side, a groove 82A provided on the Y-axis direction positive side of the fixing plate 3, and a groove 82B provided on the Y-axis direction negative side of the fixing plate 3.

Two of the respective projecting parts 81A and 81B are arranged separated along the Z axis.

Moreover, the fixing plate 3 has two projecting pieces 36 arranged on the Y-axis direction positive side, and a projecting piece 37 arranged on the Y-axis direction negative side.

As illustrated in FIG. 9, the projecting pieces 36 are each bent, projecting on the X-axis direction negative side. The groove 82A is also formed in each of the projecting pieces 36. The grooves 82A are each formed along the Z axis, opening on the Z-axis direction negative side. Moreover, each of the grooves 82A may be fit tightly to a projecting part 81A one by one.

As illustrated in FIG. 10, the projecting piece 37 is a portion bent and projecting toward the X-axis direction positive side. Two grooves 82B are formed in the projecting piece 37. The grooves 82B are formed in a crank-like form (L-shape) along the Z axis and the X axis respectively, opening toward the X-axis direction negative side. Moreover, each of the grooves 82B may be fit tightly to a projecting part 81B one by one.

When mounting the fixing plate 3 on the casing 61 using the mounting part 8 configured in this manner, this mounting is carried out by moving the fixing plate 3 in the direction of arrow α in FIGS. 9 and 10. On the other hand, when detaching the fixing plate 3 from the casing 61, this detaching is carried out by moving the fixing plate 3 in the direction of arrow β, that is, opposite direction to the arrow α in FIGS. 9 and 10. As a result, in the case where the analysis column 121 is held by the holding part 2 on the fixing plate 3, for example, the fixing plate 3 together with the analysis column 121 may be easily removed from the casing 61. Subsequently, a fixing plate 3 together with the analysis column 121 may be easily attached to the casing 61.

Moreover, the mounting part 8 has a screw member 83 for fixing the fixing plate 3 mounted (attached) on the casing 61. This allows prevention of undesired removal of the fixing plate 3.

The screw member 83 is a bolt and has a grasping part 831 whose screw head has been subjected to knurling. Note that as illustrated in FIG. 10, a through-hole 371 through which a male screw part 832 of the screw member 83 is inserted is formed by piercing the projecting piece 37 of the fixing plate 3. In addition, as illustrated in FIG. 8, the male screw part 832 is screwed to a female screw part 619 formed in the sidewall 613.

Furthermore, when loosening the screw member 83 so as to remove the fixing plate from the casing 61, since engagement of the projecting part 81A and the groove 82A and engagement of the projecting part 81B and the groove 82B support the fixing plate 3, the screw member 83 may be easily loosened without supporting the fixing plate 3 by hand, for example, thereby improving workability at the time of removing the fixing plate 3.

On the other hand, even when tightening the screw member 83, the screw member 83 may be easily tightened without supporting the fixing plate 3 by hand, for example, thereby improving workability at the time of attaching the fixing plate 3.

Note that according to this embodiment, while the projecting parts 81A and 81B are provided in the casing 61, and the grooves 82A and 82B are provided in the fixing plate 3, they are not limited thereto. For example, the projecting parts 81A and 81B may be provided in the fixing plate 3, and the grooves 82A and 82B provided in the casing 61.

Embodiments of the illustrated column oven and chromatography according to the present invention have been described above. However, the present invention is not limited thereto, and each part configuring the column oven and the chromatography may be replaced by parts with any structures that achieve the same functions. Moreover, arbitrary components may be added as well.

The column oven and the chromatography of the present invention may be any combination of two or more of the structures (characteristics) according to the respective embodiments described above.

[Aspects of Invention]

The multiple exemplary embodiments described above are understood from those skilled in the art that they are specific examples of the following aspects.

(Item 1) A column oven (6) according to an aspect includes:

a hollow casing (61);

a column unit (12) including an analysis column (121), which is arranged in the casing (161) and allows a mobile phase (Q) to flow through, and a storage unit (122), which is attached to the analysis column (121) and stores data of the analysis column (121);

multiple holding parts (2), which are arranged in the casing (61) and hold the analysis column (121);

a tabular fixing plate (3), which is arranged in the casing (61) and fixes the respective holding parts (2) to the casing (61);

multiple connecting parts (5), which are arranged in the casing (61) and connect the storage unit (122) electrically and detachably; and a heating part (63), which heats the analysis column (121) held by the holding parts (2) in the casing (61), wherein when viewing the analysis column (121) from a side facing the fixing plate (3) with the analysis column (121) held by the holding parts (2), the connecting parts (5) connected to the storage unit (122) of the column unit (12) including the analysis column (121) are arranged adjacent to the analysis column (121).

According to the column oven described in Item 1, when carrying out connecting work of the second storage unit, connection of the second storage unit to each connecting part without fail is possible due to the analysis column and the connecting part having an adjacent positional relationship.

(Item 2) The column oven (6) of Item 1, wherein when viewing the analysis column (121) from a side facing the fixing plate (3) with the analysis column (121) held by the holding parts (2), the connecting parts (5) connected to the storage unit (122) of the column unit (12) including the analysis column (121) are arranged within the entire length of the analysis column (121).

According to the column oven described in Item 2, reliable prevention of misconnection of the second storage unit is possible in cooperation with the positional relationship of the connecting part and the analysis column arranged adjacent to each other.

(Item 3) The column oven (6) of either Item 1 or Item 2, wherein the holding parts (2) and the connecting parts (5) are arranged alternately in one direction.

According to the column oven of Item 3, an adjacent pair of holding part and connecting part may be emphasized and made visible.

(Item 4) The column oven (6) of any one of Item 1 to Item 3, wherein the fixing plate (3) includes a through-hole (35), which is formed by piercing through the thickness of the fixing plate (3) and thereby making the respective connecting parts (5) visible.

According to the column oven of Item 4, the connecting part to which the second storage unit should be connected may be confirmed.

(Item 5) The column oven (6) of any one of Item 1 to Item 4, including a joining part (24), which joins the analysis column (121) and the storage unit (122) with the positional relationship kept intact.

According to the column oven of Item 5, when the analysis column is held by the holding part, connecting work of connecting the storage unit to the connecting part may be carried out due to this holding work, thereby improving workability.

(Item 6) The column oven (6) of Item 5, wherein the holding parts (2) each has a function as the joining part (24).

According to the column oven of Item 6, connecting work of connecting the storage unit to the connecting part may be carried out due to the fixing work of fixing the holding parts to the fixing plate, thereby improving workability.

(Item 7) The column oven (6) of any one of Item 1 to Item 6 includes a mounting part (8), which mounts the fixing plate (3) on the casing (61) detachably.

According to the column oven of Item 7, in the case where the analysis column is held by the holding parts on the fixing plate, for example, the fixing plate together with the analysis column can be removed from and attached to the casing.

(Item 8) The column oven (6) of Item 7, wherein the mounting part (8) has a projecting part (81) provided on either one of the casing (61) or the fixing plate (3), and a groove (82), which is provided on the other and engages with the projecting part (81).

According to the column oven of Item 8, work of removing and attaching the fixing plate from and to the casing can be easily carried out.

(Item 9) The column oven (6) of either Item 7 or Item 8, wherein the mounting part (8) has a grasping part (831) to which knurling is applied, and a screw member (83), which fixes the fixing plate (3) attached to the casing (61).

According to the column oven of Item 9, undesired removal of the fixing plate may be prevented.

(Item 10) Chromatography (1) according to an aspect includes:

the column oven (6) of any one of Item 1 to Item 9.

According to the chromatography of Item 10, when carrying out the connecting work of the second storage unit, connection of the second storage unit to the connecting part without fail is possible due to the analysis column and the connecting part having an adjacent positional relationship.

DESCRIPTION OF REFERENCES

1 Chromatography system
2, 2A, 2B, 2C, 2D, 2E, 2F Holding part
24 Joining part
25 Engagement part
3 Tabular fixing plate
31, 35, 35A, 35B, 35C, 35D, 35E, 35F Through-hole
36, 37 Projecting piece
371 Through-hole
5, 5A, 5B, 5C, 5D, 5E, 5F Connecting part
6 Column oven
61 Casing
611 Top wall
612 Bottom wall
613 Side wall
614 Partition
615 First space
616 Second space
617 Discharge opening
618 Suction opening
619 Female screw part
62 Rotational flow generation part
621 Fan
63 Heating part
631 Heater
7, 7A, 7B, 7C, 7D, 7E, 7F Column loading part
8 Mounting part
81A, 81B Projecting part
82A, 82B Groove
83 Screw member (bolt)
831 Grasping part
10 System management unit
11 Apparatus main body
12 Column unit
121 Analysis column
122 Second storage unit
123 Base end part
124 Tip part
125 Middle part
126 Wire
13 Flow channel
14 Analysis condition setting part
15 Determination part
16 First storage unit
17 Input part
20 Liquid feeder
40 Autosampler
80 Detector
AR Air
LX1, LX2 Inter-center distance
LZ Entire length
Q Mobile phase
α, β Arrow

The invention claimed is:

1. A column oven, comprising:

a hollow casing;

a column unit comprising:

an analysis column arranged in the casing and configured to allow a mobile phase to flow through; and a data storage unit attached to the analysis column and configured to store data of the analysis column specifying a type of stationary phase inside the analysis column or an individual information of the analysis column;

a plurality of mechanical supports arranged in the casing and configured to hold the analysis column;

a tabular fixing plate arranged in the casing and configured to fix the respective mechanical supports to the casing;

a plurality of detachable electrical connectors arranged in the casing and configured to connect to the data storage unit electrically and detachably; and a heater configured to heat the analysis column held by the mechanical supports in the casing, wherein when viewing the analysis column from a side facing the fixing plate with the analysis column held by the mechanical supports, the detachable electrical connectors are connected to the data storage unit of the column unit comprising the analysis column are arranged adjacent to the analysis column, wherein the fixing plate contains series of adjacent column loading units with each column loading unit including:

a detachable electrical connector of the plurality of detachable electrical connectors; and an associated mechanical support of the plurality of mechanical supports, wherein:

the detachable electrical connector of the column loading unit is configured to receive the data from the data storage unit of the analysis column held by the associated mechanical support of the column loading unit.

2. The column oven according to claim 1, wherein when viewing the analysis column from a side facing the fixing plate with the analysis column held by the mechanical supports, the detachable electrical connectors are connected to the data storage unit of the column unit comprising the analysis column are arranged within the entire length of the analysis column.

3. The column oven according to claim 1, wherein the mechanical supports and the detachable electrical connectors are arranged alternately in one direction.

4. The column oven according to claim 1, wherein the fixing plate comprises a through-hole, which is formed by piercing through the thickness of the fixing plate and thereby making the respective detachable electrical connectors visible.

5. The column oven according to claim 1, comprising a joining support, which joins the analysis column to the data storage unit at a fixed position relative to the analysis column relationship.

6. The column oven according to claim 5, wherein the mechanical supports each function as the joining support.

7. The column oven according to claim 1, comprising a mount, which detachably mounts the fixing plate on the casing.

8. The column oven according to claim 7, wherein the mount has a projecting sidewall provided on either one of the casing or the fixing plate, and a groove, which is provided on the other and engages with the projecting sidewall.

9. The column oven according to claim 7, wherein the mount has a grasping part to which knurling is applied, and a screw member, which fixes the fixing plate attached to the casing.

10. A chromatography comprising a column oven, wherein the column oven comprises the column oven of claim 1.

11. The chromatography according to claim 10, wherein when viewing the analysis column from a side facing the fixing plate with the analysis column held by the holding parts, the connecting parts connected to the storage unit of the column unit comprising the analysis column are arranged within the entire length of the analysis column.

12. The chromatography according to claim 10, wherein the holding parts and the connecting parts are arranged alternately in one direction.

13. The chromatography according to claim 10, wherein the fixing plate comprises a through-hole, which is formed by piercing through the thickness of the fixing plate and thereby making the respective connecting parts visible.

14. The chromatography according to claim 10, wherein the column oven further comprises a joining part, which joins the analysis column and the storage unit with the positional relationship kept intact.

15. The chromatography according to claim 14, wherein the holding parts each has a function as the joining part.

16. The chromatography according to claim 10, wherein the column oven further comprises a mounting part, which mounts the fixing plate on the casing detachably.

17. The chromatography according to claim 16, wherein the mounting part has a projecting part provided on either one of the casing or the fixing plate, and a groove, which is provided on the other and engages with the projecting part.

18. The chromatography according to claim 16, wherein the mounting part has a grasping part to which knurling is applied, and a screw member, which fixes the fixing plate attached to the casing.

* * * * *